(12) United States Patent
Gulick et al.

(10) Patent No.: US 6,857,033 B1
(45) Date of Patent: Feb. 15, 2005

(54) I/O NODE FOR A COMPUTER SYSTEM INCLUDING AN INTEGRATED GRAPHICS ENGINE AND AN INTEGRATED I/O HUB

(75) Inventors: Dale E. Gulick, Austin, TX (US); Larry D. Hewitt, Austin, TX (US); James Mergard, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 215 days.

(21) Appl. No.: 10/034,967

(22) Filed: Dec. 27, 2001

(51) Int. Cl.[7] .............................................. G06F 13/38
(52) U.S. Cl. ............................... 710/62; 710/2; 710/8; 710/305; 710/306
(58) Field of Search ......................... 710/2, 8, 62, 305, 710/306

(56) References Cited

U.S. PATENT DOCUMENTS

| | | | | |
|---|---|---|---|---|
| 5,794,057 A | * | 8/1998 | Lada, Jr. ..................... 713/300 |
| 5,797,028 A | * | 8/1998 | Gulick et al. ................. 712/32 |
| 5,831,637 A | * | 11/1998 | Young et al. ................. 345/501 |
| 5,978,860 A | * | 11/1999 | Chan et al. .................... 710/8 |
| 6,052,805 A | * | 4/2000 | Chen et al. .................... 714/12 |
| 6,278,532 B1 | | 8/2001 | Heimendinger et al. |
| 6,298,370 B1 | * | 10/2001 | Tang et al. .................. 718/102 |
| 6,356,968 B1 | * | 3/2002 | Kishon ....................... 710/306 |
| 6,414,525 B2 | | 7/2002 | Urakawa |
| 6,466,226 B1 | * | 10/2002 | Watson et al. ............... 345/610 |
| 6,496,895 B1 | * | 12/2002 | Harriman et al. ........... 710/306 |
| 6,516,375 B1 | * | 2/2003 | Ajanovic et al. ........... 710/305 |
| 6,532,019 B1 | * | 3/2003 | Gulick et al. ............... 345/519 |
| 6,560,666 B1 | * | 5/2003 | Harriman et al. ........... 710/305 |
| 6,574,708 B2 | * | 6/2003 | Hayter et al. ............... 711/118 |
| 6,630,945 B1 | * | 10/2003 | MacInnis et al. ........... 345/768 |

* cited by examiner

*Primary Examiner*—Kim Huynh
*Assistant Examiner*—Niketa Patel
(74) *Attorney, Agent, or Firm*—Meyertons Hood Kivlin Kowert & Goetzel, P.C.; B. Noël Kivlin; Stephen J. Curran (57) ABSTRACT

An I/O node for a computer system including an integrated graphics engine and integrated I/O hub. An input/output node that is implemented on an integrated circuit chip includes a transceiver unit, a graphics engine and an I/O hub. The transceiver unit may receive and transmit packets on a point-to-point link of a packet interface. The graphics engine may be coupled to receive graphics packets received by the transceiver unit and may render digital image information in response to receiving the graphics packets. The I/O hub may be coupled to receive I/O packets corresponding to packets received by the transceiver unit and may initiate bus cycles corresponding to the I/O packets upon a peripheral bus. The packet interface link may be a point-to-point HyperTransport™ link including a first and second set of uni-directional wires which may convey control and data packets over the same wires.

26 Claims, 6 Drawing Sheets

I/O NODE FOR A COMPUTER SYSTEM INCLUDING AN INTEGRATED GRAPHICS ENGINE AND AN INTEGRATED I/O HUB

BACKGROUND OF THE INVENTION

1. Field of the Invention

This invention relates to computer system input/output (I/O) and, more particularly, to I/O and graphics functionality.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. Examples of a shared bus used by I/O devices are a peripheral component interconnect (PCI) bus and an extended peripheral component interconnect (PCI-X) bus.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a system may connect to a PCI-X bus and a graphics bus such as AGP. The PCI-X bus may be connected to a packet bus interface that may then translate PCI-X bus transactions into packet transactions for transmission on a packet bus. Likewise the graphics bus may be connected to an AGP interface that may translate AGP transactions into packet transactions. Each interface may communicate with a host bridge associated with one of the processors or in some cases to another peripheral device.

Since transactions associated with many peripheral buses have ordering rules, many of the packet interfaces may have arbitration rules to ensure that the peripheral transactions do not become stalled. I/O devices which use communication protocols may be connected to the system via card slots on buses such as the PCI-X bus and may thus be constrained by the arbitration rules associated with the PCI-X bus. In addition, those I/O devices may have bandwidth requirements that may cause other devices connected to the PCI-X bus to be unintentionally starved or vice versa. SUMMARY OF THE INVENTION Various embodiments of an I/O node including an integrated graphics engine and an integrated I/O hub are disclosed. In one embodiment, an input/output node for a computer system that is implemented on an integrated circuit chip includes a transceiver unit, a graphics engine and an I/O hub. The transceiver unit may receive and transmit packets on a link of a packet interface. The graphics engine may be coupled to receive graphics packets received by the transceiver unit and may render digital image information in response to receiving the graphics packets. The I/O hub may be coupled to receive I/O packets corresponding to packets received by the transceiver unit and may initiate bus cycles corresponding to the I/O packets upon a peripheral bus, such as a PCI bus for example.

In one particular implementation, the I/O node may include an interface unit also implemented on the integrated circuit chip. The interface unit may be coupled to the transceiver unit and may convey packets between the transceiver unit and each of the graphics engine and the I/O hub.

In another implementation, the I/O node may include a graphics bus interface implemented on the integrated circuit chip. The graphics bus interface may be coupled to receive and to translate the graphics packets into graphics commands suitable for transmission upon a graphics bus.

In a specific implementation, the link of the packet interface may be a point-to-point HyperTransport™ link including a first set of uni-directional wires and a second set of uni-directional wires which may convey packets including control packets and data packets. The control packets may include command packets, info packets and response packets. The control and data packets may share the same wires.

In another embodiment, an input/output node is contemplated that is implemented on an integrated circuit chip that includes a transceiver unit, a graphics bus interface, a graphics engine and an I/O hub. The transceiver unit may receive and transmit packets on a link of a packet interface. The graphics bus interface may be coupled to receive packets including graphics commands and to translate the packets into graphics commands suitable for transmission upon a graphics bus. The graphics engine may be coupled receive the graphics commands via the graphics bus and may render digital image information in response to receiving the graphics commands. The I/O hub may be coupled to receive I/O packets corresponding to packets received by the transceiver unit and may initiate bus cycles corresponding to the I/O packets upon a peripheral bus, such as a PCI bus for example.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
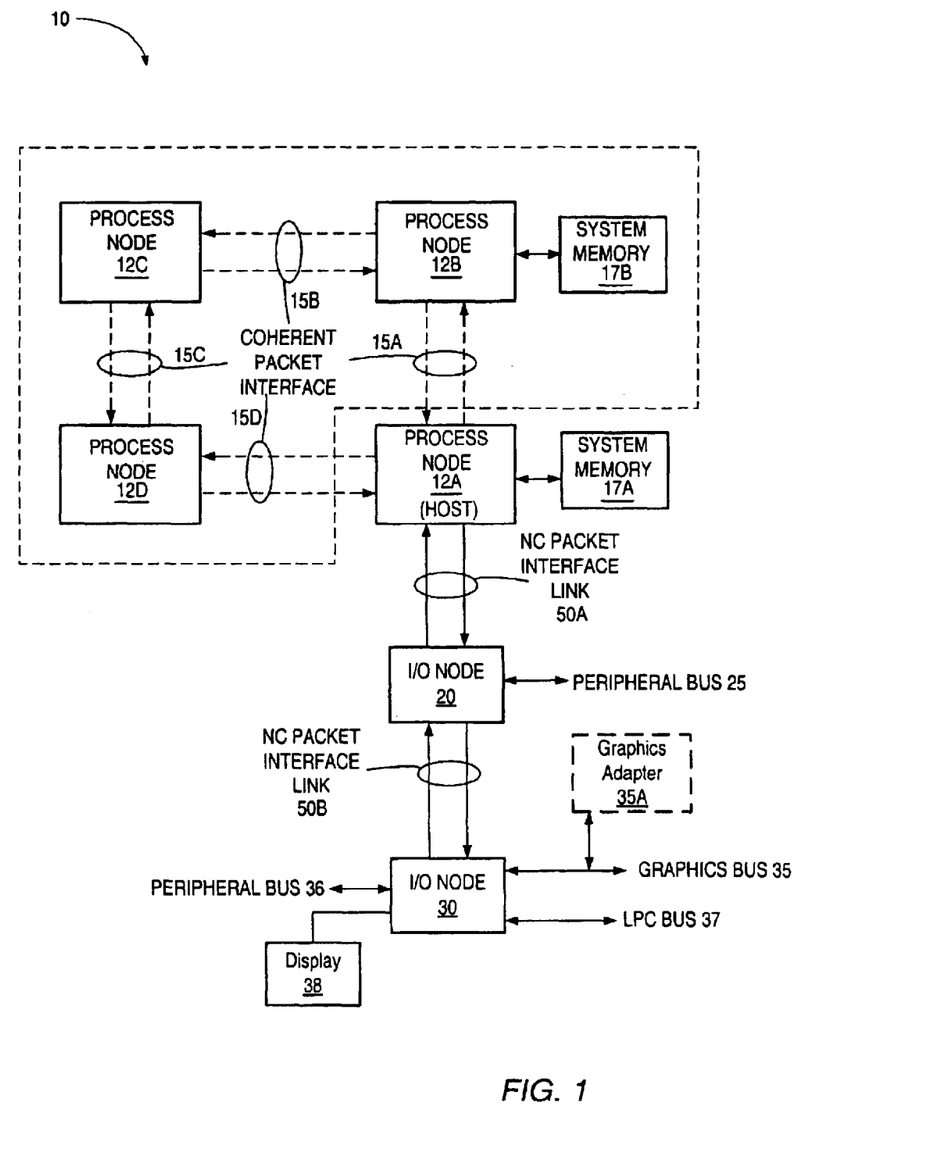
FIG. 1 is a block diagram of one embodiment of a computer system.

Turning now to FIG. 1, a block diagram of one embodiment of a computer system is shown. Computer system 10 includes process nodes 12A–12D each interconnected by coherent packet interfaces 15A–D. Each link of coherent packet interface 15 may form a high-speed point-to-point link. Process nodes 12A and 12B are also coupled to system memory 17A and 17B, respectively. Process nodes 12A–D may each include one or more processors, a memory controller for managing memory transactions to memory such as memories 17A–B. Computer system 10 also includes an I/O node 20 and an I/O node 30. I/O node 20 is coupled to process node 12A via a non-coherent packet interface 50A. 1/O node 20 is connected to I/O node 30 in a chain topology by non-coherent packet interface 50B. Process node 12A is illustrated as a host node and may include a host bridge for communicating with I/O node 20 via non-coherent packet interface 50A. Process nodes 12B–D may also include host bridges for communication with other I/O nodes (not shown). The non-coherent packet interface links formed by non-coherent a packet interface 50A–B may also be referred to as a point-to-point links. I/O node 20 is also connected to a peripheral bus 25. I/O node 30 may be connected to a graphics adapter 35A through a graphics bus 35 as denoted by the dashed lines. I/O node 30 is also connected to a peripheral bus 36 and a low pin count bus 37. As will be described in greater detail below, I/O node 30 may include interface circuitry (not shown in FIG. 1) for managing packet transfers between nodes. It is noted that in other embodiments, other numbers of process nodes and I/O nodes may be used. Further, it is contemplated that each of process nodes 12C and 12D may also be connected to a system memory.

In the illustrated embodiment, each link of coherent packet interface 15 is implemented as sets of unidirectional lines (e.g. lines 15A are used to transmit packets from processing node 12A to processing node 12B and lines 15B are used to transmit packets from processing node 12B to processing node 12C). Other sets of lines 15C–D are used to transmit packets between other processing nodes as illustrated in FIG. 1. The coherent packet interface 15 may be operated in a cache coherent fashion for communication between processing nodes ("the coherent link"). Further, non-coherent packet interface 50 may be operated in a non-coherent fashion for communication between I/O nodes and between I/O nodes and a host bridge such as the host bridge of process node 12A ("the non-coherent link"). The non-coherent links may also be implemented as sets of unidirectional lines (e.g. lines 50A are used to transmit packets from processing node 12A to I/O node 20 and lines 50B are used to transmit packets from I/O node 20 to I/O node 30). The interconnection of two or more nodes via coherent Links may be referred to as a "coherent fabric". Similarly, the interconnection of two or more nodes via non-coherent links may be referred to as a "non-coherent fabric". It is noted that a packet to be transmitted from one processing node to another may pass through one or more intermediate nodes. For example, a packet transmitted by processing node 12A to processing node 12C may pass through either processing node 12B or processing node 12D as shown in FIG. 1. Similarly, packets transmitted to I/O node 30 may first pass through I/O node 20. Any suitable routing algorithm may be used. As denoted by the dashed line surrounding process nodes 12B–D, other embodiments of computer system 10 may include more or fewer processing nodes than the embodiment shown in FIG. 1.

Process nodes 12A–12D may include one or more processors (not shown). NC packet interfaces 50A–50B may be compatible with non-coherent HyperTransport™ technology. Peripheral bus 25 and peripheral bus 36 are illustrative of a common peripheral bus such as a peripheral component interconnect (PCI) bus or an extended peripheral component interconnect (PCI-X) bus. Graphics bus 35 is illustrative of an accelerated graphics port (AGP) bus, for example. It is understood, however, that other types of interfaces and other types of peripheral buses may be used.

In general, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of process node 12A from an I/O node and "downstream" refers to packet traffic flow in the direction away from the host bridge of process node 12A to an I/O node. As will be described in greater detail below, to preserve the ordering rules of the various buses that may be connected to a given I/O node, the node may provide transaction reordering as well as packet buffering. Likewise, other nodes may include buffers for preventing commands from blocking each other due logical conflicts between packets of a given type.

Generally speaking, a "virtual channel" is a communication path for carrying packets between various processing nodes and I/O nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links. Thus, a separate receiving buffer for each virtual channel may be available prior to transmission, the virtual channels do not block each other even while using this shared resource.

In one embodiment, control packets include commands such as posted and non-posted writes, non-posted reads, and probes. In addition, control packets include responses. Thus, to support operation as described above, the coherent packet interface may support four virtual channels: posted, non-posted, response and probe. The non-coherent packet interface may support a sub-set of these virtual channels. Specifically, the probe virtual channel may not be supported (since probes are used to maintain coherency). It is noted however, that in other embodiments, other virtual channels are contemplated and may be used and supported.

As will be described in greater detail below, the interface circuits within each node may include independent virtual channel buffer locations for receiving packets from the respective link and for buffering packets to be transmitted upon the link. Computer system 10 may employ any suitable flow control mechanism for transmitting packets. For example, in one embodiment, each node may store a count of the number of each type of virtual channel buffer within the receiver at the other end of the link to which each interface logic is connected. The node does not transmit a packet unless the receiving node has a free buffer to store the packet. As receiving buffer locations are freed by routing packets onward, the receiving interface logic transmits notifications to the sending interface logic to indicate that the buffer locations have been freed.

During operation, an I/O node such as I/O node 20 may translate transactions such as PCI-X bus transactions into upstream packets that travel in I/O streams. I/O node 20 may additionally translate downstream packets into PCI-X bus transactions. All packets originating at nodes other than the host bridge of process node 12A may flow upstream to the host bridge of process node 12A before being forwarded to any other node. All packets originating at the host bridge of process node 12A may flow downstream to other nodes such as I/O node 20, or 30. As used herein, "upstream" refers to packet flow in the direction of the host bridge of process node 12A and "downstream" refers to packet flow in the direction away from the host bridge of process node 12A. Each I/O stream may be identified by an identifier called a Unit ID. It is contemplated that the Unit ID may be part of a packet header or it may be some other designated number of bits in a packet or packets. As used herein, "I/O stream" refers to all packets that contain the same Unit ID and therefore originate from the same node.

To illustrate, a peripheral device (not shown) on peripheral bus 36 initiates a transaction directed to a peripheral device (not shown) on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not claim packets to a peripheral device on peripheral bus 25 from downstream, the packets are transmitted upstream to the host bridge of process node 12A. The host bridge of process node 12A may then transmit the packets back downstream with a Unit ID of the host bridge of process node 12A until I/O node 20 recognizes and claims the packet for the peripheral device on peripheral bus 25. I/O node 20 may then translate the packets into peripheral bus transactions and transmit the transactions to a given peripheral device on peripheral bus 25.

As the packets travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, I/O node 30 may provide an integrated I/O hub and an integrated graphics engine. The integrated I/O hub may provide peripheral interfaces (shown in FIG. 6A and 6B) which may typically be associated with a south bridge for devices which may otherwise be connected to a peripheral bus such as peripheral bus 36. For example, I/O node 30 may include an industry standard architecture (ISA) bus interface for LPC bus 37 or a PCI bus interface (shown in FIG. 6A and 6B). The integrated graphics engine may be used to drive display 38.

Figure 2:
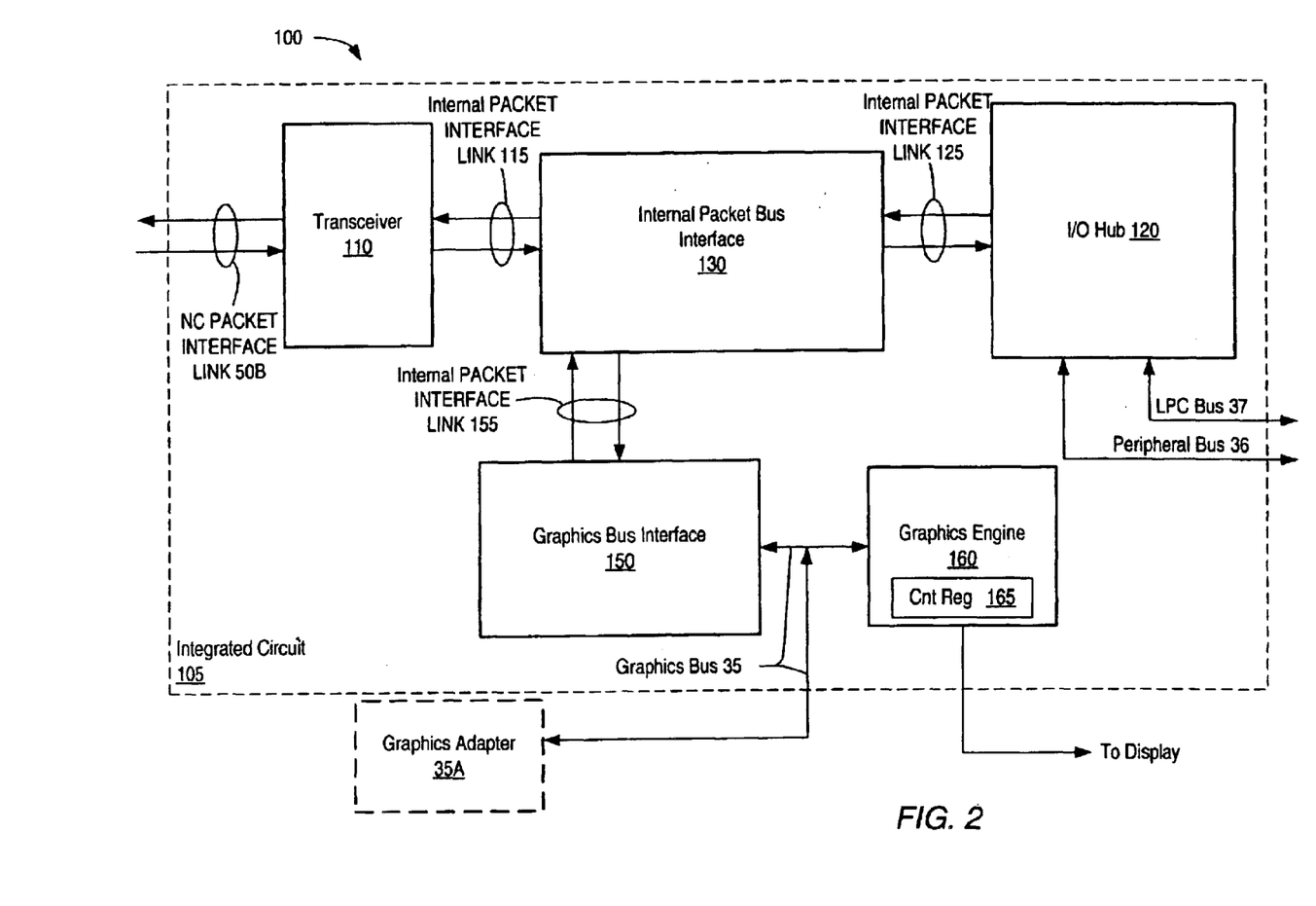
FIG. 2 is a block diagram of one embodiment of an I/O node.

Referring to FIG. 2, a block diagram of one embodiment of an I/O node is shown. Circuit components that correspond to those shown in FIG. 1 are numbered identically for simplicity and clarity. I/O node 100 is implemented on a single integrated circuit chip 105. I/O node 100 includes a transceiver unit 110 which is coupled to a link of NC packet interface 50B and to an internal packet bus interface 130 via an internal packet interface link 115. I/O node 100 also includes an I/O hub 120 which is also coupled to internal packet bus interface 130 via an internal packet interface link 125. I/O hub 120 is coupled to peripheral bus 36 and to LPC bus 37. I/O node 100 further includes a graphics bus interface 150 which is coupled to a graphics engine 160 through graphics bus 35. Graphics bus interface 150 is coupled to receive transactions from transceiver unit 110 through internal packet bus interface 130 and internal packet interface link 155. Graphics engine 160 may be connected to a display such as display 38 of FIG. 1.

Transceiver 110 may be configured to transmit and receive packets over NC packet interface link 50B. Transceiver 110 may include buffers and control logic (not shown) necessary to buffer incoming packets. Transceiver 110 may also include interface logic (not shown) for transmitting and receiving packets within I/O node 100 via internal packet interface link 115.

I/O hub 120 may include circuitry (not shown in FIG. 2) which may translate packets into an I/O protocol suitable for use by I/O hub 120. Additionally, I/O hub 120 may include circuitry (also not shown in FIG. 2) which may translate transactions from an I/O protocol suitable for use by I/O hub 120 into packets for transmission on internal packet link 125. Further, I/O hub 120 may include circuitry which provides peripheral bus support for peripheral bus 26 and for LPC bus 37. I/O hub 120 is described in greater detail below in conjunction with the description of FIG. 6A and FIG. 6B.

Internal packet bus interface 130 may include a collection of internal bus structures (not shown) and control logic (not shown) used to convey packets internal to I/O node 100. The internal bus structures may include command, data and control buses used to convey packets between transceiver 110 and each of graphics interface 160 and I/O hub 120.

In a typical computer system, a processor may send graphics commands to an external graphics adapter. In the illustrated embodiment, graphics adapter 35A may include a graphics processor and circuitry (not shown) for generating or rendering digital images and converting the images into signals suitable for use by a display. Graphics adapter 35A may also transmit the digital images for storage in a system memory. Graphics bus interface 150 may be used to translate transactions between the I/O packet interface protocol and a graphics bus protocol such as the AGP protocol, for example. As mentioned above, graphics bus interface 150 may translate bus cycles received from graphics bus 35 into packets for transmission on internal packet interface link 115. In addition, graphics bus interface 150 may translate graphics packets into bus cycles suitable for transmission upon graphics bus 35. Graphics bus interface 150 may also include arbitration and buffering logic (not shown) for scheduling graphics bus transactions and maintaining graphics transaction ordering rules.

As an alternative to using an external graphics adapter, a processor may send graphics commands to integrated graphics engine 160 via graphics bus interface 150. Graphics engine 160 may include a graphics processor and circuitry (not shown) for generating or rendering digital images and converting the images into signals suitable for use by a display. It is contemplated that the graphics signals may be in either an analog or digital format for driving a display such as an RGB monitor or an LCD display. Graphics engine 160 may also include a bus interface (not shown) for transmitting and receiving digital image information and commands on graphics bus 35 thereby allowing the transmission of the digital images for storage and subsequent retrieval in a system memory. Graphics engine 160 also includes a control register 165 which may be configured to selectively enable or disable graphics engine 160. In addition, it is contemplated that control register 165 may be configured to select other graphics related functions such as display resolution and timing, for example. Since in typical computer systems only one graphics processor may be in use at a given time, graphics engine 160 may be disabled using control register 165 while an external graphics adapter (e.g. graphics adapter 35A) is used. Alternatively, graphics engine 160 may be enabled when there is no external graphics adapter being used.

It is noted that in one embodiment, graphics engine 160 may be implemented as a lower end (i.e. less graphics functionality) graphics engine than some external graphics adapters that may be available. Thus, by integrating a graphics engine such as graphics engine 150 into the integrated circuit chip of an I/O node, a computer system provider may provide an alternative low-cost graphics solution to its customers by allowing them to use graphics engine 160. However, for customers that prefer a higher-end (i.e. more graphics functionality) or a customized graphics solution, graphics engine 160 may be disabled via control register 165 and an external graphics adapter such as graphics adapter 35A may be connected to graphics bus 35 and used to drive a suitable display device. In other embodiments, graphics engine 160 may be a full function graphics engine employing high-end graphics functions.

Figure 3:
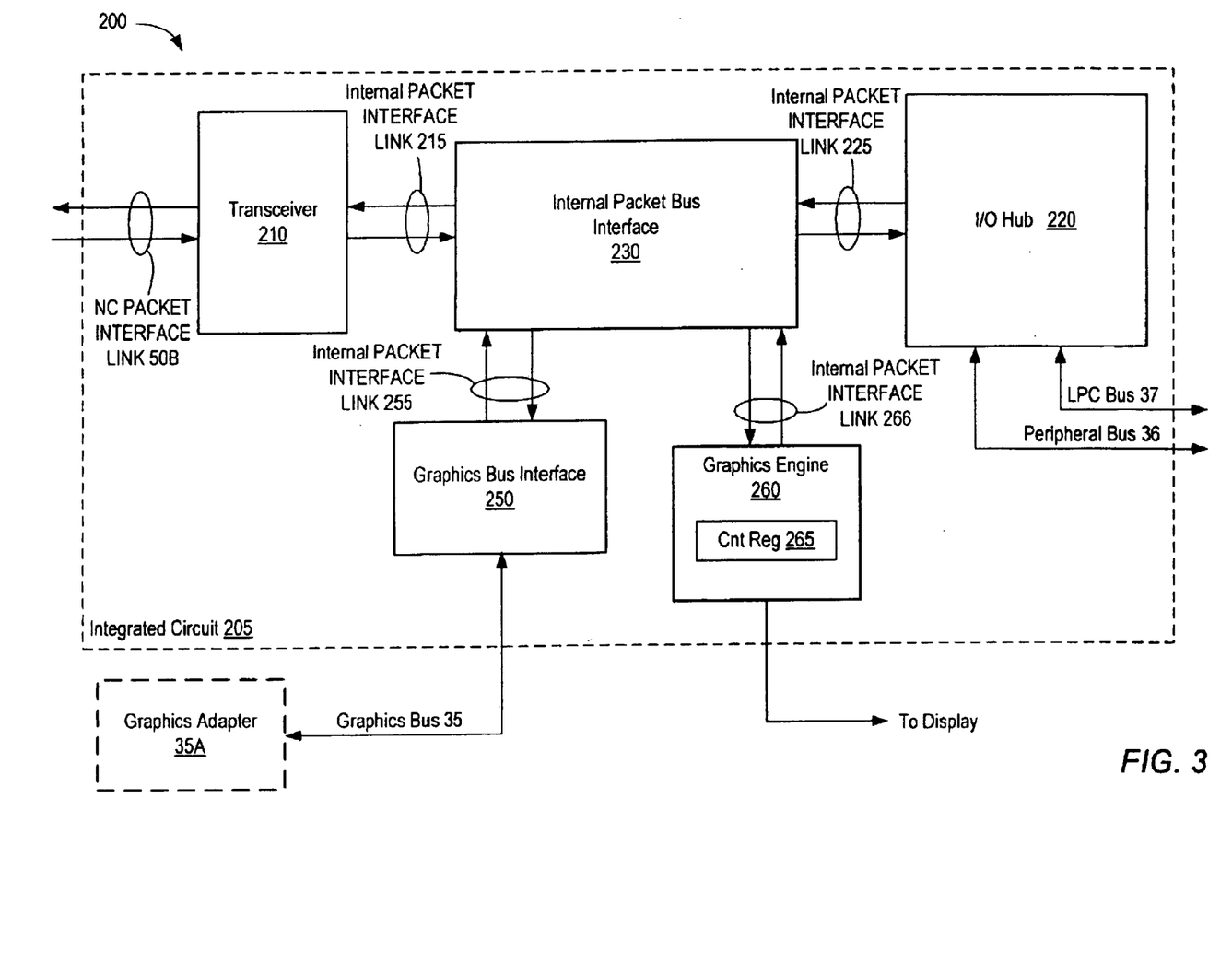
FIG. 3 is a block diagram of a second embodiment of an I/O node.

Turning to FIG. 3, a block diagram of second embodiment of an I/O node is shown. Circuit components that correspond to those shown in FIG. 1 and FIG. 2 are numbered identically for simplicity and clarity. I/O node 200 is implemented on a single integrated circuit chip 205. I/O node 200 includes a transceiver unit 210 which is coupled to NC packet interface link 50B and to an internal packet bus interface 230 via an internal packet interface link 215. I/O node 200 also includes an I/O hub 220 which is coupled to internal packet bus interface 230 via an internal packet interface link 225. I/O hub 220 is also coupled to peripheral bus 36 and to LPC bus 37. 10 node 200 further includes a graphics bus interface 250 which is coupled to a graphics bus 35. Graphics bus interface 250 is coupled to receive transactions from transceiver unit 210 through internal packet bus interface 230 and internal packet interface link 255. Graphics engine 260 is also coupled to internal packet bus interface 230 via an internal packet interface link 266. Graphics engine 260 may be connected to a display such as display 38 of FIG. 1.

Transceiver 210 operates in substantially the same manner as transceiver 110 of FIG. 2. Thus, the description of transceiver 210 is omitted here for brevity.

I/O hub 220 operates in substantially the same manner as I/O hub 120 of FIG. 2. Thus, the description of I/O hub 220 is omitted here for brevity.

Similar to FIG. 2, internal packet bus interface 230 may include a collection of internal bus structures (not shown) used to convey packets internal to I/O node 200. The internal bus structures may include command, data and control buses used to convey packets between transceiver 210 and each of graphics interface 260, graphics engine 260 and I/O hub 220.

As described above in FIG. 2 graphics adapter 35A may include a graphics processor and circuitry (not shown) for generating or rendering digital images and converting the images into signals suitable for use by a display. Thus, as above, graphics bus interface 250 of FIG. 3 may be used to translate transactions between the I/O packet interface protocol and a graphics bus protocol such as the AGP protocol, for example. As mentioned above, graphics bus interface 250 may translate bus cycles received from graphics bus 35 into packets for transmission on internal packet interface link 255. In addition, graphics bus interface 250 may translate graphics packets into bus cycles suitable for transmission upon graphics bus 35. Graphics bus interface 250 may also include arbitration and buffering logic (not shown) for scheduling graphics bus transactions and maintaining graphics transaction ordering rules.

As an alternative to using an external graphics adapter, a processor may send graphics commands to integrated graphics engine 260 via internal packet interface link 266. Graphics engine 260 may include a graphics processor and circuitry (not shown) for generating or rendering digital images and converting the images into signals suitable for use by a display. It is contemplated that the graphics signals may be in either an analog or digital format for driving a display such as an RGB monitor or an LCD display. Graphics engine 260 may also include a packet interface circuit (not shown) for translating packets containing digital image information and commands which have been sent via internal packet interface link 266 into signals suitable for use by graphics engine 260. Further the packet interface circuit may translate graphics commands and data into packets for transmission upon internal packet interface link 266. Graphics engine 260 also includes a control register 265 which may be configured to selectively enable or disable graphics engine 260. In addition, it is contemplated that control register 265 may be configured to select other graphics related functions such as display resolution and timing, for example. Since in typical computer systems only one graphics processor may be in use at a given time, graphics engine 260 may be disabled using control register 265 while an external graphics adapter (e.g. graphics adapter 35A) is used. Alternatively, graphics engine 260 may be enabled when there is no external graphics adapter being used.

Likewise, as described the description of FIG. 1, it is noted that in one embodiment, graphics engine 260 may be implemented as a lower end (i.e. less graphics functionality) graphics engine than some external graphics adapters that may be available. In other embodiments however, graphics engine 260 may be a full function graphics engine employing high-end graphics functions.

Figure 4:
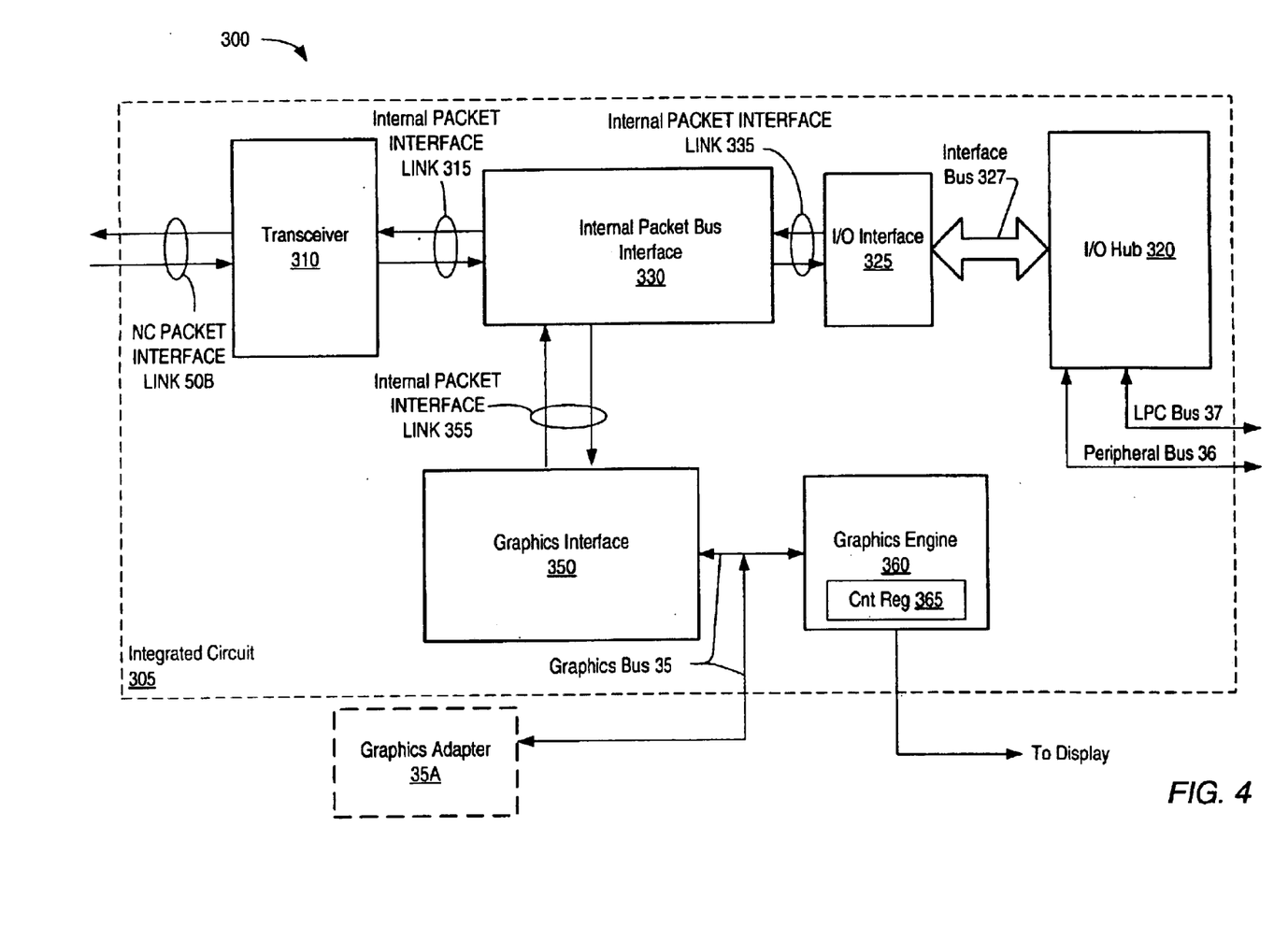
FIG. 4 is a block diagram illustrating a third embodiment of an I/O node.

Referring to FIG. 4, a block diagram of a third embodiment of an I/O node is shown. Circuit components that correspond to those shown in FIG. 1 through FIG. 3 are numbered identically for simplicity and clarity. I/O node 300 is implemented on a single integrated circuit chip 305. I/O node 300 includes a transceiver unit 310 which is coupled to a link of NC packet interface 50B and to an internal packet bus interface 330 via an internal packet interface link 315. I/O node 300 also includes an I/O interface 325 which is coupled to internal packet bus interface 330 via an internal packet interface link 335. I/O interface 325 is coupled to an I/O hub 320 via an interface bus 327. I/O hub 320 is coupled to peripheral bus 36 and to LPC bus 37. I/O node 300 further includes a graphics bus interface 350 which is coupled to an integrated graphics engine 360 through graphics bus 35. Graphics bus interface 350 is coupled to receive transactions from transceiver unit 310 through internal packet bus interface 330 and an internal packet interface link 355. Graphics engine 360 may be connected to a display such as display 38 of FIG. 1.

Transceiver 310 operates in substantially the same manner as transceiver 110 of FIG. 2 and transceiver 210 of FIG. 3. Thus, the description of transceiver 310 is omitted here for brevity.

Internal packet bus interface 330 may include a collection of internal bus structures (not shown) used to convey packets internal to I/O node 300. The internal bus structures may include command, data and control buses used to convey packets between transceiver 310 and each of graphics interface 360 and I/O interface 325.

In the illustrated embodiment, I/O hub 320 is shown coupled to I/O interface 325 via interface bus 327. Thus, as described below interface bus 327 may be used to convey packets between I/O hub 320 and I/O interface 325. Otherwise, I/O hub 320 operates in substantially the same manner as I/O hub 120 of FIG. 2 and I/O hub 220 of FIG. 3. Thus, the description of I/O hub 320 is omitted here for brevity.

I/O interface 325 may be configured to translate packets from one protocol to another. For example, I/O interface 325 may translate packets received from internal packet interface link 335 into packet suitable for transmission on interface bus 327. Likewise, I/O interface 325 may translate packets received from interface bus 327 into packet suitable for transmission on internal packet interface link 335. I/O interface 325 may therefore include buffers and arbitration circuitry (not shown) for scheduling I/O transactions and maintaining any I/O transaction ordering rules. In the illustrated embodiment, interface bus 327 is a packet bus configured to convey packetized information. For example in one embodiment, interface bus 327 may include address, a data and command and control lines. Further, interface bus 327 may include one or more clock lines corresponding to portions of the address, data and command and control lines.

As described above in FIG. 2 and FIG. 3 graphics adapter 35A may include a graphics processor and circuitry (not shown) for generating or rendering digital images and converting the images into signals suitable for use by a display. Thus, as above, graphics bus interface 350 may be used to translate transactions between the I/O packet interface protocol and a graphics bus protocol such as the AGP protocol, for example. Graphics bus interface 350 may translate bus cycles received from graphics bus 35 into packets for transmission on internal packet interface link 355. In addition, graphics bus interface 350 may translate graphics packets into bus cycles suitable for transmission upon graphics bus 35. Graphics bus interface 350 may also include arbitration and buffering logic (not shown) for scheduling graphics bus transactions and maintaining graphics transaction ordering rules.

As an alternative to using an external graphics adapter, graphics engine 360 may be used for generating or rendering digital images and converting the images into signals suitable for use by a display. Graphics engine 360 may also include a graphics bus interface (not shown) for transmitting and receiving digital image information and commands on graphics bus 35 thereby allowing the transmission of the digital images for storage and subsequent retrieval in a system memory. Graphics engine 360 also includes a control register 365 which may be configured to selectively enable or disable graphics engine 360. In addition, it is contemplated that control register 365 may be configured to select other graphics related functions such as display resolution and timing, for example. Since in typical computer systems only one graphics processor may be in use at a given time, graphics engine 360 may be disabled using control register 365 while an external graphics adapter (e.g. graphics adapter 35A) is used. Alternatively, graphics engine 360 may be enabled when there is no external graphics adapter being used.

Likewise, as above, it is noted that in one embodiment, graphics engine 360 may be implemented as a lower end (i.e. less graphics functionality) graphics engine than some external graphics adapters that may be available. In other embodiments however, graphics engine 360 may be a full function graphics engine employing high-end graphics functions.

Figure 5:
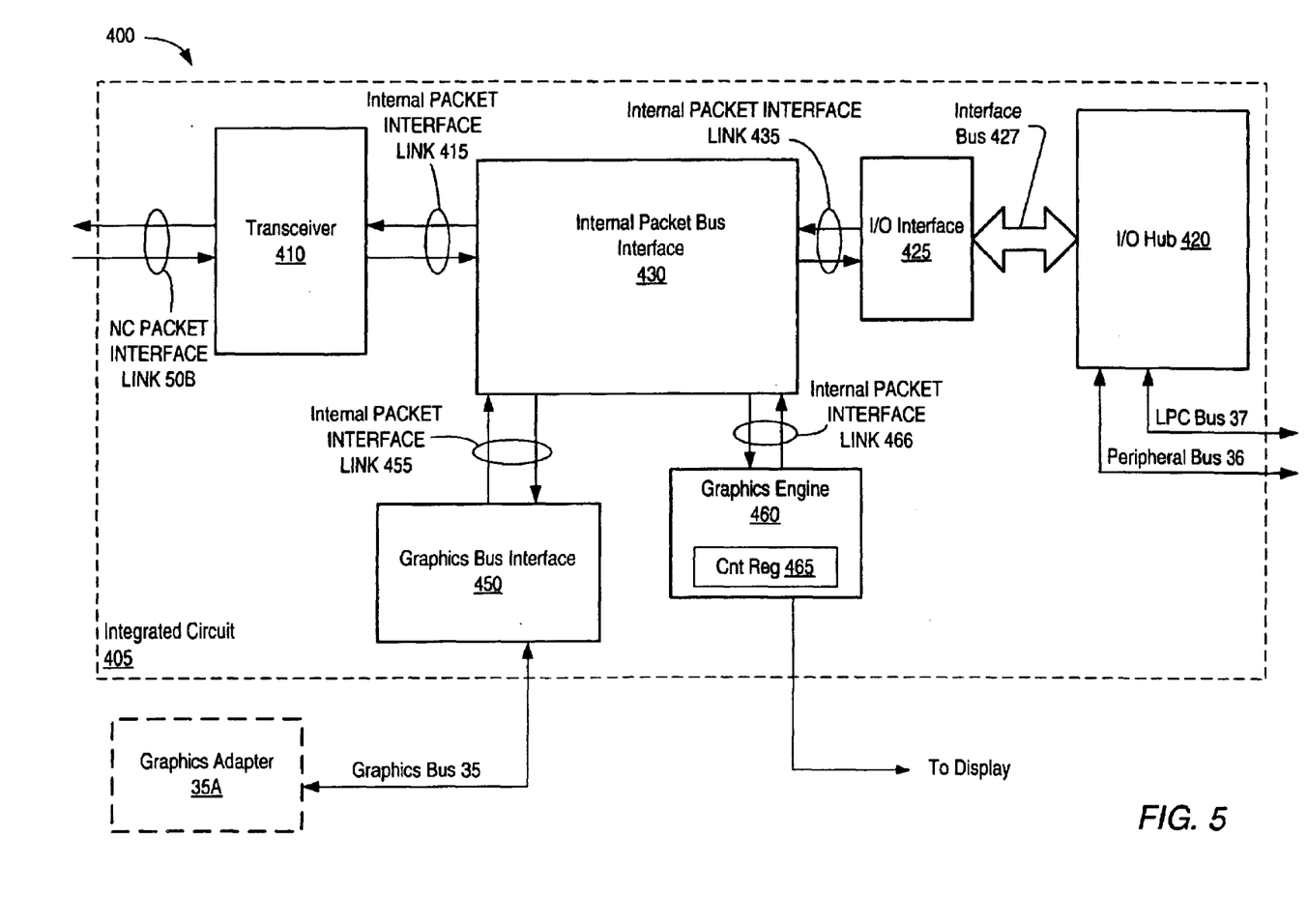
FIG. 5 is a block diagram illustrating a fourth embodiment of an I/O node.

Turning now to FIG. 5, a block diagram illustrating a fourth embodiment of an I/O node is shown. Circuit components that correspond to those shown in FIG. 1 through FIG. 4 are numbered identically for simplicity and clarity. I/O node 400 is implemented on a single integrated circuit chip 405. I/O node 400 includes a transceiver unit 410 which is coupled to a link of NC packet interface 50B and to an internal packet bus interface 430 via an internal packet interface link 415. I/O node 400 also includes an I/O interface 425 which is coupled to internal packet bus interface 330 via an internal packet interface link 435. I/O interface 425 is coupled to an I/O hub 320 via an interface bus 427. I/O hub 420 is coupled to peripheral bus 36 and to LPC bus 37. I/O node 400 further includes a graphics bus interface 450 which is coupled to a graphics bus 35. Graphics bus interface 450 is coupled to receive transactions from transceiver unit 410 through internal packet bus interface 430. Graphics engine 460 is also coupled to internal packet bus interface 430 via an internal NC packet interface 466. Graphics engine 460 may be connected to a display such as display 38 of FIG. 1.

Transceiver 410 operates in substantially the same manner as transceiver 110 of FIG. 2. Thus, the description of transceiver 410 is omitted here for brevity.

Internal packet bus interface 430 may include a collection of internal bus structures (not shown) used to convey packets internal to I/O node 400. The internal bus structures may include command, data and control buses used to convey packets between transceiver 410 and each of graphics interface 460, graphics engine 460 and I/O hub 420.

I/O hub 420 operates in substantially the same manner as I/O hub 320 of FIG. 4. Thus, the description of I/O hub 420 is omitted here for brevity.

I/O interface 425 may be configured to translate packets from one protocol to another. For example, I/O interface 425 may translate packets received from internal packet interface link 435 into packet suitable for transmission on interface bus 427. Likewise, I/O interface 425 may translate packets received from interface bus 427 into packet suitable for transmission on internal packet interface link 335. I/O interface 425 may therefore include buffers and arbitration circuitry (not shown) for scheduling I/O transactions and maintaining any I/O transaction ordering rules. In the illustrated embodiment, interface bus 427 is a packet bus configured to convey packetized information. For example in one embodiment, interface bus 427 may include address, data and command and control lines. Further, interface bus 427 may include one or more clock lines corresponding to portions of the address, data and command and control lines.

As described above in FIG. 2 through FIG. 4, graphics adapter 35A may include a graphics processor and circuitry (not shown) for generating or rendering digital images and converting the images into signals suitable for use by a display. Thus, as above, graphics bus interface 450 may be used to translate transactions between the I/O packet interface protocol and a graphics bus protocol such as the AGP protocol, for example. As mentioned above, graphics bus interface 450 may translate bus cycles received from graphics bus 35 into packets for transmission on internal packet interface link 455. In addition, graphics bus interface 450 may translate graphics packets into bus cycles suitable for transmission upon graphics bus 35. Graphics bus interface 450 may also include arbitration and buffering logic (not shown) for scheduling graphics bus transactions and maintaining graphics transaction ordering rules.

As an alternative to using an external graphics adapter, integrated graphics engine 460 may be used for generating or rendering digital images and converting the images into signals suitable for use by a display. It is contemplated that the graphics signals may be in either an analog or digital format for driving a display such as an RGB monitor or an LCD display. Graphics engine 460 may include a packet interface (not shown) for transmitting and receiving packets containing digital image information and commands via internal packet interface link 466. Graphics engine 460 also includes a control register 465 which may be configured to selectively enable or disable graphics engine 460, since only one graphics processor may be in use at a given time in typical computer systems. In addition, it is contemplated that control register 465 may be configured to select other graphics related functions such as display resolution and timing, for example.

Likewise, as above, it is noted that in one embodiment graphics engine 460 may be implemented as a lower end (i.e. less graphics functionality) graphics engine than some external graphics adapters that may be available. In other embodiments however, graphics engine 460 may be a full function graphics engine employing high-end graphics functions.

Figure 6A:
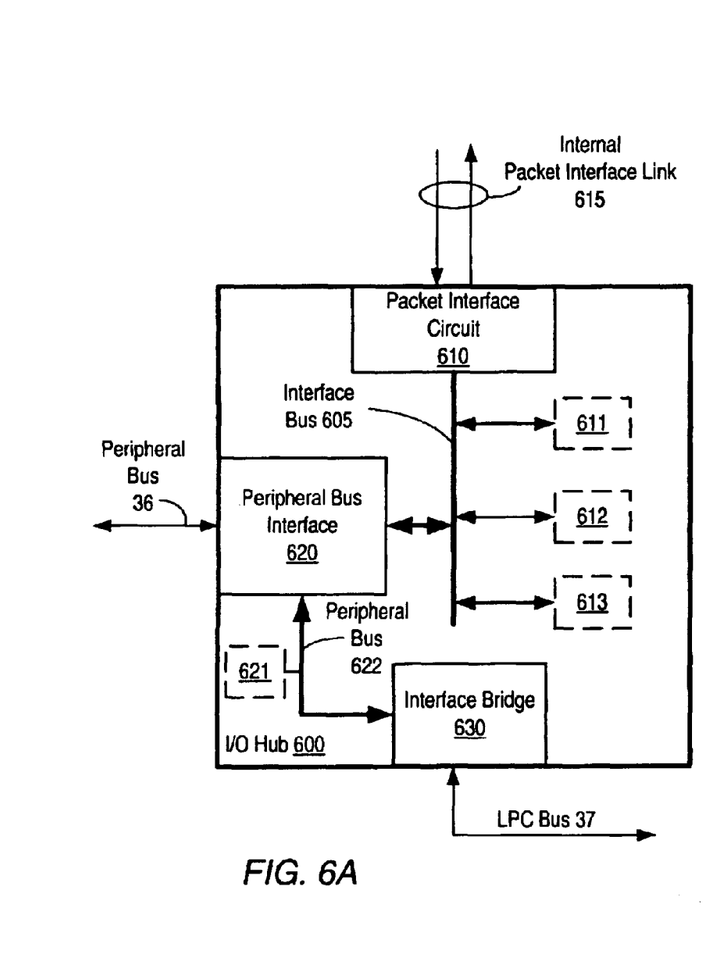
FIG. 6A is a block diagram of one embodiment of an I/O hub.

Turning to FIG. 6A, a block diagram of one embodiment of an I/O hub is shown. Circuit components that correspond to those shown in FIG. 1 through FIG. 5 are numbered identically for simplicity and clarity. I/O hub 600 is an example of an I/O hub that may be used in the embodiments described in FIG. 2 and FIG. 3. I/O hub 600 includes a packet interface circuit 610 coupled to an internal packet interface link 615. I/O hub 600 further includes a peripheral bus interface 620 coupled to packet interface circuit 610 via interface bus 605. Peripheral bus interface 620 is also coupled to a peripheral bus 36 and to an interface bridge 630 by peripheral bus 622. I/O node 600 may also include several internal devices coupled to interface bus 605 and they are labeled 611, 612 and 613. Further, I/O node may include one or more internal devices coupled to peripheral bus 622, such as device 621, for example.

Peripheral bus interface 620 may be configured to translate packets into bus cycles suitable for transmission upon peripheral bus 36 or peripheral bus 22. Likewise, peripheral bus interface 620 may be configured to translate bus cycles received on peripheral bus 36 or peripheral bus 22 into packets suitable for transmission upon interface bus 605. In one embodiment, peripheral bus 36 and peripheral bus 622 may be PCI buses. Thus, any devices which may be connected to them may be PCI devices.

Interface bridge 630 may contain buffers and circuitry (not shown) configured to translate bus cycles received on peripheral bus 622 into bus cycles suitable for transmission upon LPC bus 37. Likewise, interface bridge 630 may be configured to translate bus cycles received on LPC bus 37 into bus cycles suitable for transmission upon peripheral bus 622. In one embodiment, interface bridge 630 is an Industry Standard Architecture (ISA) to PCI bridge.

In the illustrated embodiment, interface bus 605 is a packet bus configured to convey packetized information. For example in one embodiment, interface bus 605 may include address, data and command and control lines. Further, interface bus 605 may include one or more clock lines corresponding to portions of the address, data and command and control lines.

Figure 6B:
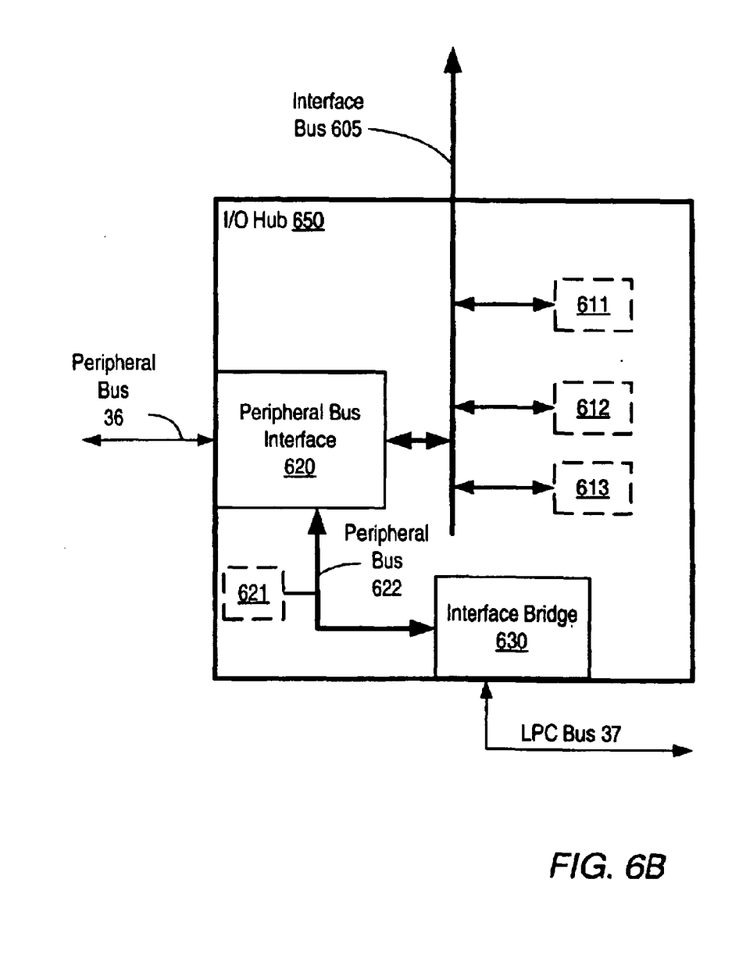
FIG. 6B is a block diagram of another embodiment of an I/O hub.

Referring to FIG. 6B, a block diagram of another embodiment of an I/O hub is shown. I/O hub 650 is an example of an I/O hub that may be used in the embodiments described in FIG. 4 and FIG. 5. I/O hub 650 includes components which operate substantially the same as I/O hub 600 of FIG. 6A. Thus, circuit components that correspond to those shown FIG. 6A are numbered identically for simplicity and clarity and will not be described further. However, in contrast to I/O hub 600, I/O hub 650 of FIG. 6B does not include a packet interface circuit such as packet interface circuit 610 of FIG. 6A. Thus, to convey packets into and out of I/O hub 650, interface bus 605 of FIG. 6B is brought out and used instead of an internal packet interface link. Thus, in the illustrated embodiment, interface bus 605 of I/O hub 650 may be coupled to an interface such as I/O interface 425 of FIG. 5.

Numerous variations and modifications will become apparent to those skilled in the art once the above disclosure is fully appreciated. It is intended that the following claims be interpreted to embrace all such variations and modifications.

What is claimed is:

1. An input/output node for a computer system, said input/output node comprising:
   a transceiver unit implemented on an integrated circuit chip, wherein said transceiver unit is configured to receive and transmit packets on a point-to-point link of a packet interface;
   a graphics engine implemented on said integrated circuit chip, wherein said graphics engine coupled to receive graphics packets received by said transceiver unit and is configured to render digital image information in response to receiving said graphics packets; and
   an I/O hub implemented on said integrated circuit chip, wherein said I/O hub is coupled to receive I/O packets corresponding to packets received by said transceiver unit and is configured to initiate bus cycles corresponding to said I/O packets upon a peripheral bus.

2. The input/output node as recited in claim 1 further comprising an interface unit implemented on said integrated circuit chip, wherein said interface unit is coupled to said transceiver united is configured to convey packets between said transceiver unit and each of said graphics engine and said I/O hub.

3. The input/output node as recited in claim 1 further comprising a graphics bus interface implemented on said integrated circuit chip, wherein said graphics bus interface is coupled to receive and to translate said graphics packets into graphics commands suitable for transmission upon a graphics bus.

4. The input/output node as recited in claim 1, wherein said I/O hub is further configured to receive peripheral transaction bus cycles from said peripheral bus and to transmit packets corresponding to said peripheral transaction bus cycles to said transceiver unit.

5. The input/output node as recited in claim 1, wherein said graphics engine includes a configuration register, wherein said configuration register provides a user selectable bit for enabling and disabling said graphics engine.

6. The input/output node as recited in claim 1, wherein said graphics engine is further configured to translate said digital image information into packets suitable for transmission upon said point-to-point link of a packet interface.

7. The input/output node as recited in claim 1, wherein said point-to-point link of a packet interface includes a first set of uni-directional wires and a second set of uni-directional wires each configured to convey packets including control packets and data packets, wherein said control packets include command packets, info packets and response packets and wherein said control packets and data packets share the same wires.

8. The input/output node as recited in claim 7, wherein said I/O hub is coupled to receive said I/O packets via said point-to-point link of a packet interface.

9. The input/output node as recited in claim 1, wherein said I/O hub is coupled to receive said I/O packets via an internal packet bus.

10. A computer system comprising:
    a processing node including one or more processors;
    a link of a packet interface coupled to said processing node;
    an input/output node coupled to said link, said input/output node including:
      a transceiver unit implemented on an integrated circuit chip, wherein said transceiver unit is configured to receive and transmit packets on a point-to-point link of a packet interface;
      a graphics engine implemented on said integrated circuit chip, wherein said graphics engine is coupled to receive graphics packets received by said transceiver unit and is configured to render digital image information in response to receiving said graphics packets; and
      an I/O hub implemented on said integrated circuit chip, wherein said I/O hub is coupled to receive I/O packets corresponding to packets received by said transceiver unit and is configured to initiate bus cycles corresponding to said I/O packets upon a peripheral bus.

11. The computer system as recited in claim 10, wherein said input/output node further comprising an interface unit implemented on said integrated circuit chip, wherein said interface unit is coupled to said transceiver unit and is configured to convey packets between said transceiver unit and each of said graphics engine and said I/O hub.

12. The computer system as recited in claim 10, wherein said input/output node further comprising a graphics bus interface implemented on said integrated circuit chip, wherein said graphics bus interface is coupled to receive and to translate said graphics packets into graphics commands suitable for transmission upon a graphics bus.

13. The computer system as recited in claim 10, wherein said I/O hub is further configured to receive peripheral transaction bus cycles from said peripheral bus and to transmit packets corresponding to said peripheral transaction bus cycles to said transceiver unit.

14. The computer system as recited in claim 10, wherein said graphics engine includes a configuration register, wherein said configuration register provides a user selectable bit for enabling and disabling said graphics engine.

15. The computer system as recited in claim 10, wherein said graphics engine is further configured to translate said digital image information into packets suitable for transmission upon said point-to-point link of a packet interface.

16. The computer system as recited in claim 10, wherein said point-to-point link of a packet interface includes a first set of uni-directional wires and a second set of uni-directional wires each configured to convey packets including control packets and data packets, wherein said control packets include command packets, info packets and response packets and wherein said control packets and data packets share the same wires.

17. The computer system as recited in claim 16, wherein said I/O hub is coupled to receive said I/O packets via said point-to-point link of a packet interface.

18. The computer system as recited in claim 10, wherein said I/O hub is coupled to receive said I/O packets via an internal packet bus.

19. An input/output node for a computer system, said input/output node comprising:
    a transceiver unit implemented on an integrated circuit chip, wherein said transceiver unit is configured to receive and transmit packets on a point-to-point link of a packet interface;
    a graphics bus interface implemented on said integrated circuit chip, wherein said graphics bus interface is coupled to receive packets including graphics commands and to translate said packets into graphics commands suitable for transmission upon a graphics bus;

a graphics engine implemented on said integrated circuit chip and coupled to said graphics bus, wherein said graphics engine is coupled to receive said graphics commands via said graphics bus and is configured to render digital image information in response to receiving said graphics commands; and an I/O hub implemented on said integrated circuit chip, wherein said I/O hub is coupled to receive I/O packets corresponding to packets received by said transceiver unit and is configured to initiate bus cycles corresponding to said I/O packets upon a peripheral bus.

20. The input/output node as recited in claim 19 further comprising an interface unit implemented on said integrated circuit chip, wherein said interface unit is coupled to said transceiver unit and is configured to convey packets between said transceiver unit and each of said graphics engine and said I/O hub.

21. The input/output node as recited in claim 19, wherein said I/O hub is further configured to receive peripheral transaction bus cycles from said peripheral bus and to transmit packets corresponding to said peripheral transaction bus cycles to said transceiver unit.

22. The input/output node as recited in claim 19, wherein said graphics engine includes a configuration register, wherein said configuration register provides a user selectable bit for enabling and disabling said graphics engine.

23. The input/output node as recited in claim 19, wherein said graphics engine is further configured to translate said digital image information into packets suitable for transmission upon said point-to-point link of a packet interface.

24. The input/output node as recited in claim 19, wherein said point-to-point link of a packet interface includes a first set of uni-directional wires and a second set of uni-directional wires each configured to convey packets including control packets and data packets, wherein said control packets include command packets, info packets and response packets and wherein said control packets and data packets share the same wires.

25. The input/output node as recited in claim 24, wherein said I/O hub is coupled to receive said I/O packets via said point-to-point link of a packet interface.

26. The input/output node as recited in claim 19, wherein said I/O hub is coupled to receive said I/O packets via an internal packet bus.

* * * * *

UNITED STATES PATENT AND TRADEMARK OFFICE
CERTIFICATE OF CORRECTION

PATENT NO. : 6,857,033 B1
DATED : February 15, 2005
INVENTOR(S) : Dale E. Gulick, Larry D. Hewitt and James Mergard It is certified that error appears in the above-identified patent and that said Letters Patent is hereby corrected as shown below:

Column 13,
Line 17, please change "engine coupled" to -- engine is coupled --.
Line 30, please change "united" to -- unit and --.

Signed and Sealed this

Twelfth Day of July, 2005

JON W. DUDAS
*Director of the United States Patent and Trademark Office*